July 13, 1948.　　　W. W. PAGET　　　2,444,952
PUMP CONTROL MECHANISM
Filed April 11, 1945　　　6 Sheets-Sheet 2

Inventor:
Wm. W. Paget.
by
Lewis A. Maxson.
Att'y.

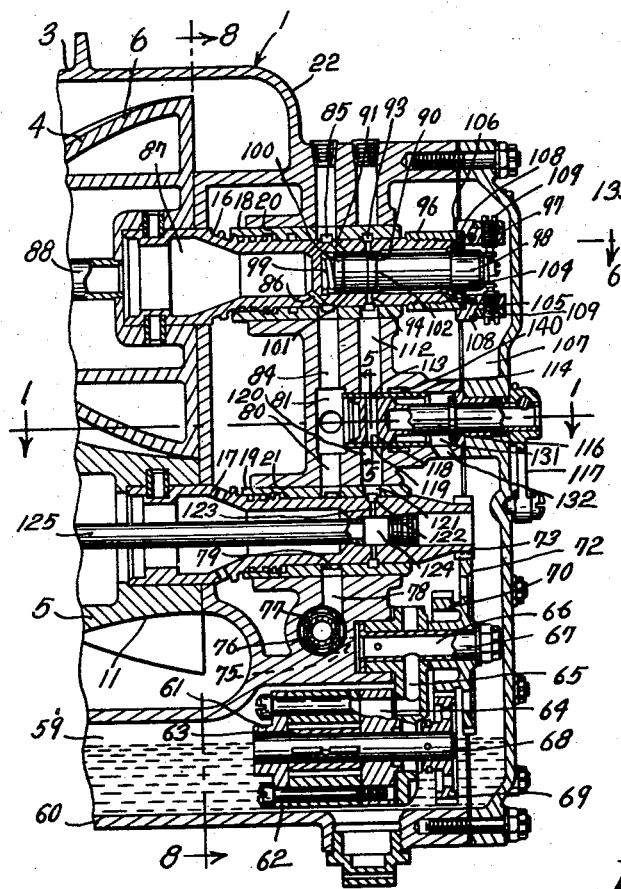

July 13, 1948. W. W. PAGET 2,444,952
PUMP CONTROL MECHANISM
Filed April 11, 1945 6 Sheets-Sheet 4

Inventor:
Win W. Paget.
By Anis A. Maxom
Att'y.

July 13, 1948. W. W. PAGET 2,444,952
PUMP CONTROL MECHANISM
Filed April 11, 1945 6 Sheets-Sheet 5

Inventor:
Win W. Paget.
by
Davis A. Maxon
Atty.

July 13, 1948.  W. W. PAGET  2,444,952

PUMP CONTROL MECHANISM

Filed April 11, 1945  6 Sheets—Sheet 6

Inventor:
Win W. Paget.
by
Lewis A. Maxam.
Atty.

Patented July 13, 1948

2,444,952

UNITED STATES PATENT OFFICE 2,444,952

PUMP CONTROL MECHANISM

Wm. W. Paget, Michigan City, Ind., assignor to Joy Manufacturing Company, a corporation of Pennsylvania Application April 11, 1945, Serial No. 587,663

23 Claims. (Cl. 98—1.5)

My invention relates to air pumping apparatus, and more particularly to means for regulating automatically the discharge of fluid by a pumping apparatus.

In the pressurizing of an aircraft cabin it is customary to deliver air from a supercharger or compressor to the cabin, and to vent the air from the cabin at a rate to maintain the desired pressures therein. With a cabin pressure vent or control valve of ordinary construction there will be a maintenance of the desired cabin pressure not withstanding a relatively widely varied supply rate of air to the cabin. Accordingly, there is an opportunity for a substantial waste of power in the compressor and the pumping of air in an unnecessary excess to the cabin.

According to my invention it is proposed to bleed air from the cabin pressurizer in such a manner that the amount delivered will be held relatively constant at substantially the desired rate during flight below a predetermined' elevation. It is planned to do this by utilizing a device which will regulate the venting under the control of pressure differentials created by variations in mass flow of air to the cabin, high mass flow creating high differentials that increase bleeding and reduce flow to the cabin, and diminished mass flow resulting in reduced pressure differentials which cause diminished bleeding. It is further planned to superimpose on this control a control which is responsive to ambient pressure and which shall, as ambient pressure drops below cabin pressure, cause greater and greater degrees of reduction in bleeding to attend like pressure differentials, and which, at the ambient pressure existing at the predetermined elevation, effects a closure of the bleeding device so that the compressor discharges all of its air at full compression to the cabin, and the differential pressure produced by variation in mass flow then becomes entirely ineffective in the control of the bleeding device.

An object of my invention is to provide improved means for controlling the delivery of air to an aircraft cabin. Another object is to provide improved means for controlling the discharge of air from a compressor to an aircraft cabin so as to maintain the supply of air to the latter relatively constant during flight below a predetermined elevation. Still another object is to provide improved means responsive to the mass flow of air in a discharge line of a compressor for regulating the bleeding of air from the compressor. Yet another object is to provide improved means responsive to pressure differentials produced by variations in mass flow of air in a compressor discharge line, and operative in response to such pressures for maintaining the mass flow in the discharge line substantially constant. Another object is to provide, for a compressor discharging air to an aircraft cabin, improved control means responsive to ambient pressures and to pressure differentials produced by variations in mass flow of air in the compressor discharge line, and operative in response to such pressures for maintaining the flow of air through the discharge line substantially constant during flight below a predetermined elevation and for delivering to the cabin after compression through the full built-in compression ratio all of the air taken into the compressor during flight above the predetermined elevation. Other objects of my invention will appear in the course of the following description.

In the accompanying drawings there are shown for purposes of illustration two forms which the invention may assume in practice.

In these drawings:

Fig. 4 is a vertical sectional view taken on the plane of the line 4—4 of Fig. 1.

Fig. 5 is an enlarged fragmentary transverse section on the plane of the line 5—5 of Fig. 4.

Fig. 6 is a section on the planes of the line 6—6 of Fig. 5.

Fig. 7 is a plan view, with parts shown in section, of the pumping apparatus of Fig. 1.

Figure 10:
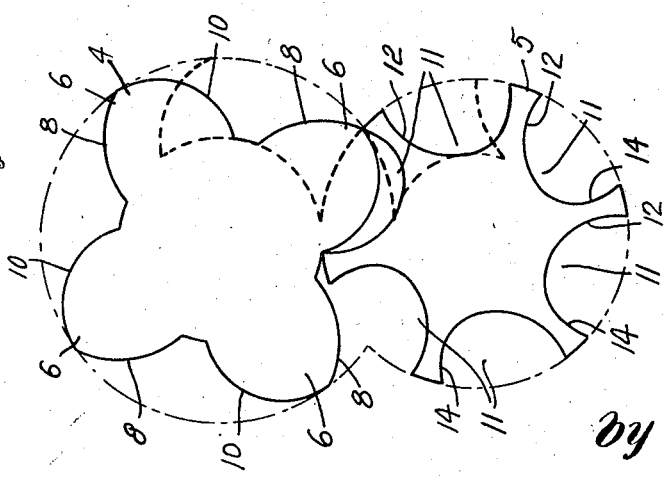
Fig. 10 is a schematic diagram showing the outline of the rotors and the intersection of the discharge chamber with the walls of the rotor chambers as viewed from the left-hand end of the latter in Fig. 1.

The pumping apparatus shown in Figs. 1 to 11, except for the discharge connections and certain control means, is similar to that shown in my copending application, Serial No. 452,299, filed July 25, 1942. The differences will later appear. This pumping apparatus, generally designated 1, comprises a main casing 3 containing a pair of coacting rotors 4 and 5. The rotor 4 is a male rotor and, as shown in Fig. 10, has four helically arranged lobes 6, the rearward sides 8 of which are shown as generated curves in profile, while the leading or pressure side 10 of each of these lobes is, in profile, substantially in the form of a circular arc. The female rotor 5 is provided, in the form shown in Fig. 10, with six helically arranged grooves 11 each adapted to cooperate with the lobes of the rotor 4, and the leading concave surfaces 12 of the grooves 11 are in profile substantially in the form of an arc to coact with the arcuate pressure surfaces 10 of the lobes of the rotor 4, while the following concave surfaces 14 of the grooves 11 are generated curves in profile. A different form of rotor construction, or even quite a different type of compressor, may be used if desired without departing from various aspects of my invention. With the rotors constructed and arranged as illustrated, it will be evident that they will have low and high pressure ends.

The rotors are adapted to operate with space packing; that is to say, they are maintained in such relation to each other, through gearing, that there is no actual contact between the rotors, but such close spacing that at the high speeds of operation there is negligible leakage. The rotors 4 and 5 are supported at their low pressure ends, as shown in Fig. 4, by stub shafts 16 and 17 which are, in turn, supported in bearing sleeves 18 and 19 received within bores 20 and 21 in an end casing portion 22 formed integral with the casing 3. The high pressure ends of the rotors are also provided with stub shafts, 16' and 17' (Fig. 9), which are also supported in suitable bearings. The casing 3 is provided with an intake chamber 24 with which an intake passage 25 communicates, and the intake chamber communicates with the right-hand, low pressure ends of the rotors, and also for a substantial part of the length of the rotors communicates with the back portions thereof, the portions of the rotors at the sides of the latter opposite the discharge. The casing 3 is also provided with a discharge chamber 26 at the high pressure ends of the rotors (the left-hand ends thereby as viewed in Fig. 1), and with another chamber 27, whose purpose will later be described.

For the purpose of maintaining the rotors out of contact with each other they are connected at their discharge ends by intermeshing helical gears 30 and 31, the gear 30 being splined to the stub shaft 16' supporting the rotor 4, and the gear 31 being splined to the stub shaft 17' supporting the rotor 5. Regardless of the speed at which the rotors turn, these gears operate to maintain the space packing heretofore referred to; in other words, a very small clearance, between the surfaces of the lobes and the sides and bottoms of the grooves of the rotors is maintained, thus preventing wear and permitting the operation of the pump at high speeds. By reason of the smallness of the clearance maintained and the high speeds of rotation, serious leakage is prevented, as above noted. The gear 31 is connected by a one-way clutch to a drive shaft for effecting rotation of the rotors during starting and during those periods in which the drive shaft is turning at comparatively slow speeds. Arranged at the discharge ends of the rotors are gears 33 and 34 for driving the rotors at comparatively high speeds. The gear 34 is connectible to the drive shaft by a fluid actuated clutch, and, on the application of this clutch by fluid supplied thereto, the gear 34 is connected to the drive shaft and operates to drive the gear 33 which is connected by a shaft 35 to the gear 30. The ratio of the gears 33 and 34 is such that the gear 30 is driven at a greater speed by these gears than it is by the gear 31. Driving of the gear 30 at an increased speed causes the gear 31 to rotate at a speed greater than that at which it would be driven if driven by the drive shaft. The gear 31 may be driven at this greater speed by reason of the one-way clutch, which releases when this gear rotates at a speed greater than that of the drive shaft. This subject matter is more fully disclosed in my application hereinabove identified.

The compressor is provided with a speed responsive device for controlling the supply of an operating fluid, in this case a liquid, to the fluid actuated clutch mentioned above. There is also provided a hydraulically actuated unloading means for the compressor, and means responsive to the flow of fluid in the compressor discharge line for controlling the flow of an operating liquid relative to the unloading means so as to maintain relatively constant the supply of fluid from the compressor to the cabin during flight of the aircraft below a predetermined elevation. Further means responsive to the pressures at the exterior of the cabin are provided for effecting a loading of the compressor when the aircraft goes above the predetermined altitude.

It will be understood that the rotors 4 and 5 cooperate with each other and with the casing 3 to form chambers which diminish progressively in volume as the rotors are caused to rotate. Fluid contained within these chambers is compressed, if no means of escape is provided, until the chambers open into the discharge chamber 26. In order that the supply of air to the cabin may be maintained relatively constant, and that the air supplied may not be unduly compressed so as to cause excessive heating, there is provided an opening 38 through which air may be vented from the compressor to the chamber 27 which is connected in communication with the space surrounding the aircraft by a conduit 39. The opening 38 communicates with the interior of the casing 3 at such a point between the ends of the rotors that no compression of the fluid takes place before communication with the opening is had; and the relationship of the opening 38 to the discharge chamber 26 is such that no compression of fluid will take place between the times when the compression chambers move out of communication with the opening 38 and when they move into communication with the discharge chamber.

To control the opening 38, there is provided a valve 40 whose shape is such that when the same is closed it conforms very closely to the inner walls of the casing 3. This valve is connected by pins 41 to a support member 42 which is secured by a pivot pin 43 to the casing 3. A shoulder 44 on the valve and a shoulder 45 on the casing limit the closing movement of the valve to a position in which the walls of the valve conform exactly to the surface of the rotor chamber. This valve is adapted normally to be maintained open by a spring 47 engaging at one end the wall of a member 48 which forms a portion of the enclosure of the chamber 27 and which is secured in any suitable manner to the casing 3. The other end of the spring acts against a piston 50 received within a cylinder bore 51 which is formed in a cylinder providing member 52 also secured in any suitable manner to the casing 3 in a position overlying the member 48. A piston rod or operating stem 53 is connected at its outer end to the piston 50 and is connected at its inner end by means of an elongated eye 54 and a pin 55 to the valve 40. The piston 50 and the member 52 cooperate in forming a servo motor 56 to which fluid may be admitted through a passage 57 under the control of means hereinafter described. When the servo motor is not under pressure delivered through the passage 57, the valve 40 is moved to an open position by the spring 47. When, however, sufficient pressure fluid is supplied to the servo motor, the piston 50 will be caused, through the operating stem 53, to close the valve 40, and the compressor will then operate fully loaded. The pressure fluid used is a liquid, as later shown, so the valve can be maintained in various positions of adjustment. Thus, depending upon the position of the valve 40, there is provided a displacement pump for delivering a reduced quantity of air to the cabin and a compressor which is capable of delivering air under a substantial pressure to the cabin.

As previously indicated, the change in speed in operation of the compressor and the loading and unloading of the compressor are both hydraulically controlled. The liquid for the hydraulic control system is contained within a sump 59 disposed between the lower wall of the rotor housing and an outer wall 60 forming an integral part of the casing 3. The sump is, in the horizontal position of the compressor, substantially horizontal, and a pump 61 of the intermeshing gear type is positioned at the right-hand end of the sump as viewed in Fig. 4, so that it is partly submerged and so that its intake is always submerged in the oil contained therein. The pump 61 includes a casing 62 containing rotors 63 having intermeshing teeth. Oil is admitted to the interior of the pump casing through a suitable intake passage and is carried around by the teeth of the rotors to a discharge port 64 which communicates with a passage 65 opening into the bore 66 of a sleeve member 67. One of the rotors is provided with a shaft 68 which carries a gear 69 meshing with a pinion 70 rotatably supported on the sleeve member 67. A larger gear 72 is formed integral with the gear 70 and is driven by a pinion 73 formed integral with the stub shaft 17. Liquid delivered to the bore 66 of the sleeve member 67 is discharged through a passage 75 into a chamber 76 containing a strainer 77. The liquid passes through the strainer 77 to a passage 78 which opens into an annular groove 79 formed in the inner periphery of the bearing bushing 19. The opposite side of the annular groove 79 opens into a passage 80 which communicates at its upper end with a chamber 81. The chamber 81 constitutes a distribution point for oil for lubricating purposes and for operating the speed changing clutch mechanism, previously described, and for closing the valve 40. In line with the passage 80 is another passage 84 opening out of the chamber 81, and this passage communicates with an annular groove 85 in the bushing 18. Communicating with the annular groove 85 are obliquely disposed passages 86 opening into a chamber 87 in the stub shaft 16. The chamber 87 is connected by a tube 88 centered within the rotor 4 for conducting oil to the gears 30, 31 and 33, 34 for lubricating latter. The oil conducted to these gears is returned by suitable passage means to the sump 60.

The stub shaft 16 is provided with a valve receiving bore 90 to which oil may be supplied from the annular groove 85 through obliquely extending passages 91. Formed in the bushing 18 surrounding the valve receiving bore is an annular groove 93 which is connected with the interior of the bore 90 by radial passages 94. Supported on the outer end of the stub shaft 16 is a mounting 96 for a speed responsive governor 97 which operates to vary the position of a valve member 98 in the bore 90. Acting between the valve member 98 and the inner end of the bore 90 is a spring 99 which tends to move the valve member outwardly against the action of the speed responsive device 97. Formed on the valve member adjacent its inner end is a collar 100, and spaced from this collar by an annular groove 101 in the valve member is another collar 102, and at the right-hand end of the valve member is an enlarged collar 104 spaced from the collar 102 by an annular groove 105. The collar 104 is slidably supported by the support member 96 for the speed responsive device, and the annular groove 105 is connected by passages 106 in the support member 96 into communication with a chamber 107 which communicates with the sump 59.

The speed responsive device 97 includes flyweights 108 which are pivotally supported by the support member 96. These flyweights carry adjustable screw devices 109 which engage the outer end of the vavle member 98 and, upon attainment of the shaft 16 to a predetermined speed of rotation, the flyweights actuate the valve member to shift it from a position in which the annular groove 101 connects the passages 91 and 94 in communication with each other to a position cutting off the communication between these passages and connecting the passages 94 in communication with the annular groove 105 thereby allowing fluid entering the bore 90 through the passage 94 to be vented while at the same time preventing any delivery of fluid from the pump to the radial passages 94. The venting of fluid from these passages through the bore 90 will effect, as shortly described, a reduction in the speed of the rotors. This reduction in speed, however, will not be sufficient to effect an operation of the speed responsive device which permits the valve to move again to a position for supplying fluid to the passages 94, as the design of the governor is such that it becomes operative to force the valve 98 to the left only upon the attainment of a predetermined speed while, but once assuming this position a falling off of the speed to a much lower speed will be necessary before the weights will be moved in the opposite direction. This subject matter is quite fully described, except for the special relation of the port 38 to the rotors, in my copending application above mentioned.

The annular groove 93 is connected below the stub shaft 16 with a passage 112 which extends downwardly and communicates through an opening 113 with the interior of a valve receiving bushing 114. This valve receiving bushing contains a rotatable valve 116 having an operating handle 117 by means of which the valve may be turned into any one of three different positions. In the position of the valve 116, shown in Fig. 4, a diametric passage 118 connects the opening 113 with an opposite opening 119 in the valve sleeve, and the latter opening communicates with a passage 120 which is connected through a port 121 in the bearing sleeve 19 and an annular groove 122 and radial passages 123 with a chamber 124 within the interior of the stub shaft 17. The chamber 124 is connected by a tube 125 in communication with the fluid actuated clutch for controlling the operation of the driving gear 34. It may be pointed out that the valve 98 at speeds of the rotor 4 below a predetermined number of R. P. M. will be in the position shown in Fig. 4 and will connect the pump discharge through the ports and passages previously described with the tube 125, but that at speeds above such a predetermined number of R. P. M. the valve 98 will be moved to the left to cut off communication completely between the passages 84 and 112 and to vent passage 112 back to the sump through the chamber 107.

The mode of operation of the mechanism, so far described, is as follows: When the compressor is started, a driving connection is immediately established between the drive shaft and the gear 31, and the pump 61 commences to deliver fluid through the passage 65 to the strainer 77, where the fluid is strained and then conducted through the passages 78 and 80, the chamber 81, the passages 84 and 91, the annular groove 101, the radial passages 94, the passages 112, 118 and 120, and the tubular conduit 125 to the fluid actuated clutch for the gear 34. The clutch will be actuated by the fluid supplied thereto for connecting the gear 34 to the drive shaft so that driving of the compressor will take place through the gears 34, 33, the shaft 35 and the gears 30, 31. The compressor will then be driven at a high speed which will be continued until the speed becomes such that valve 98 is shifted by the speed responsive device 97 to cut off the supply of fluid from the pump to the passage 112 and to connect this passage through the annular groove 105 and the chamber 107 to the sump. The venting of fluid from the fluid actuated clutch will result in a release of the driving connection through the gear 34 and will cause drive to take place at a lower speed through the gear 31.

The manually rotatable valve 116 previously mentioned can be adjusted to such a position as to restore high-speed drive of the compressor after such high-speed drive has been automatically interrupted, or to prevent interruption of high-speed drive upon the attainment of the predetermined speed of operation at which a shift to low-speed drive is normally effected. In another position of this valve, the drive of the compressor at a high-speed may be prevented. In addition to the diametric passage 118 formed in the valve 116, there is a longitudinal passage 130, as shown in Fig. 6, which opens into the space 131 at the right-hand end of the valve, a space which is connected by a passage 132 with the chamber 107 which communicates with the sump. When the valve 116 is turned to bring the passage 130 into communication with the passage 120 and to blank off the port 113, fluid will be vented from the clutch mechanism through the tubular conduit 125, passage 120 and the peripheral passage 130 to the sump. The valve 116 also has an oppositely extending peripheral groove 135 opening through its end which forms a portion of the bounding wall of the chamber 81. When the valve is turned so as to bring the groove 135 into communication with the passage 120, fluid will be supplied from the chamber 81 continuously to the passage 120 and the tube 125, and high-speed drive of the compressor will alone be possible.

Figure 1:
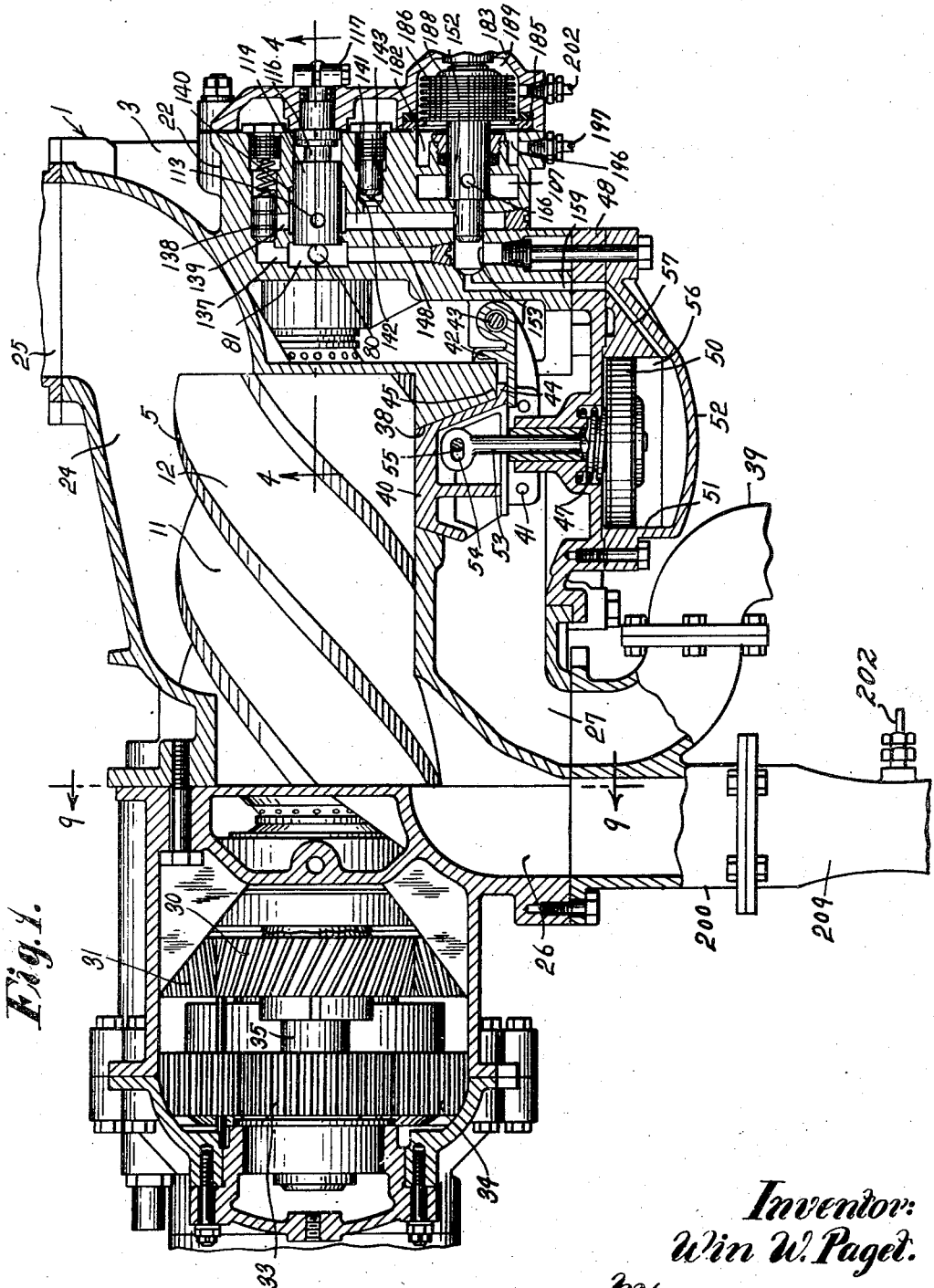
Fig. 1 is a horizontal longitudinal sectional view of a pumping apparatus, with parts shown in elevation, the view being taken on the plane of the line 1—1 of Fig. 4.
Figure 2:
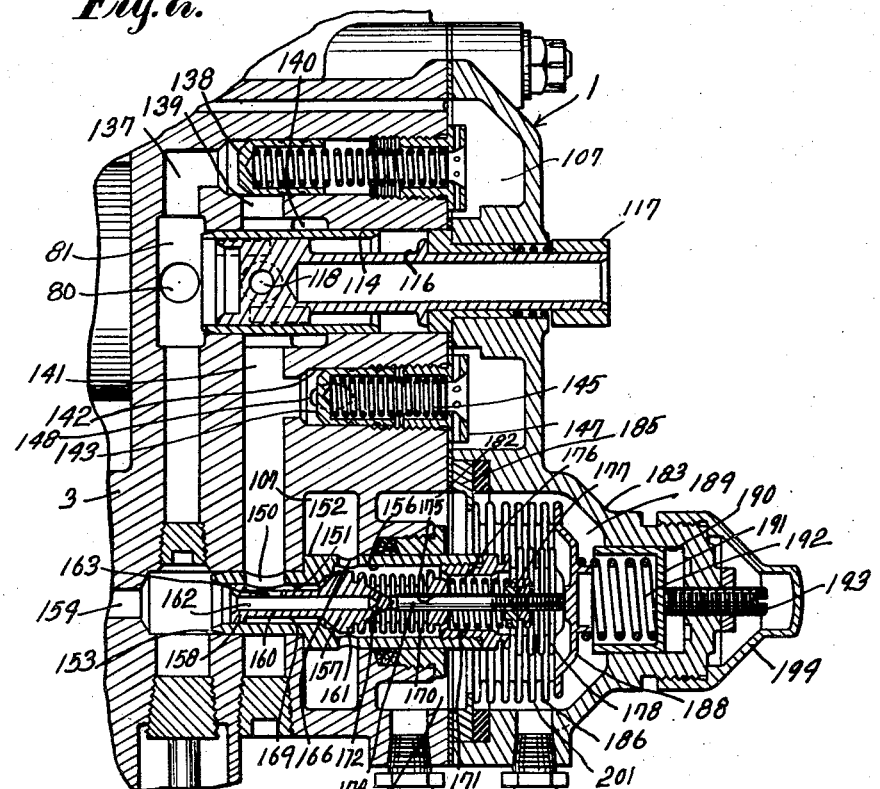
Fig. 2 is an enlarged, fragmentary sectional view taken on the plane of Fig. 1.
Figure 3:
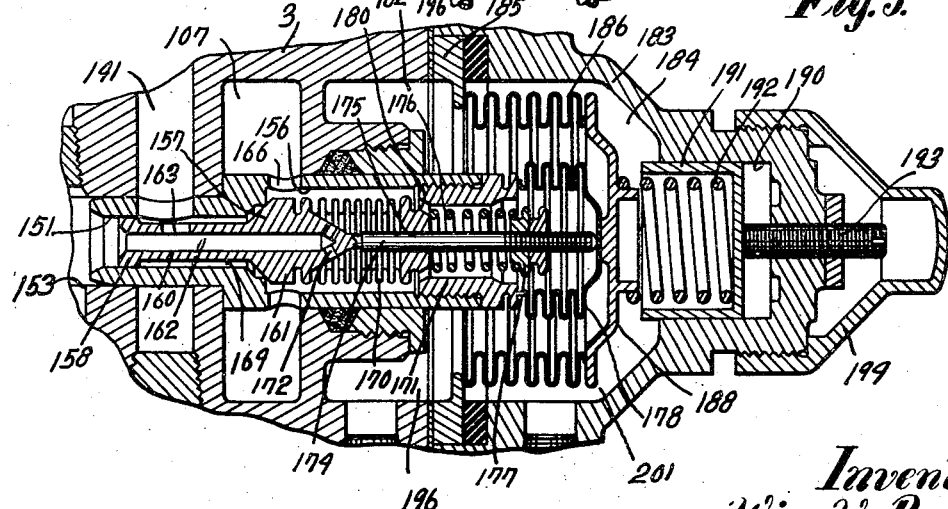
Fig. 3 is a further enlarged, sectional view taken on the plane of Fig. 2, showing only a portion of the control means for the hydraulic system.
Figure 8:
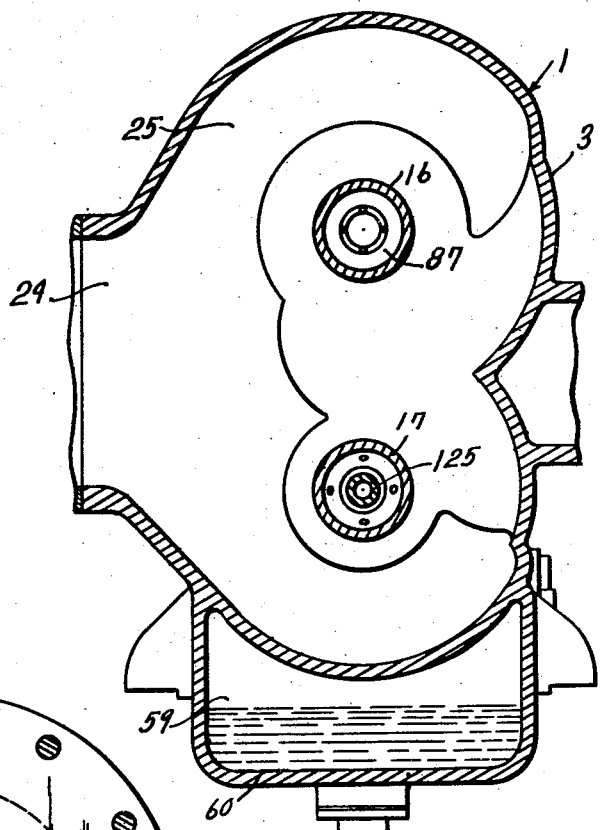
Fig. 8 is a vertical sectional view on the plane of the line 8—8 of Fig. 4, showing the intake end of the pumping apparatus of Fig. 1.
Figure 9:
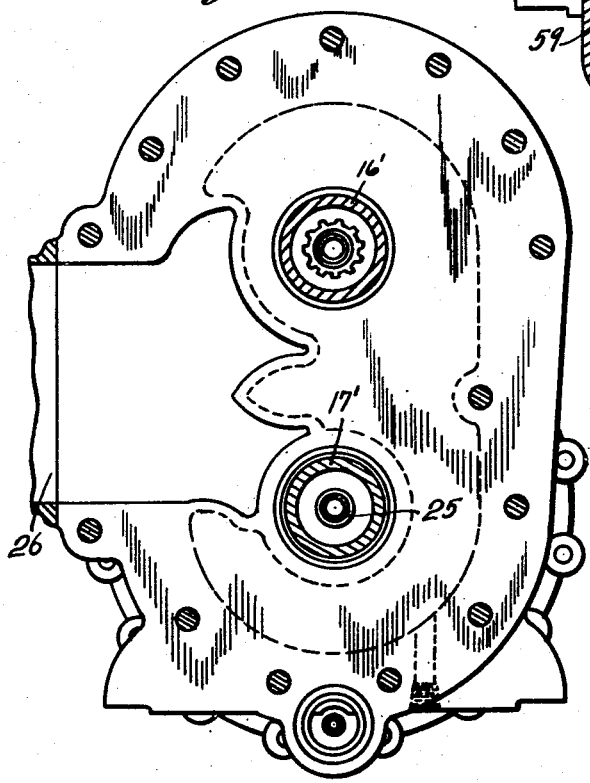
Fig. 9 is a vertical sectional view taken on the plane of the line 9—9 of Fig. 1, showing the high pressure head of the pumping apparatus of Fig. 1.
Figure 11:
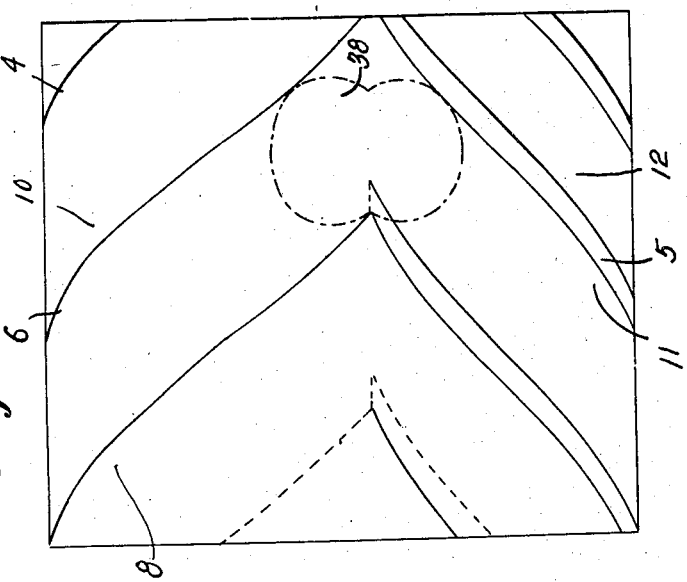
Fig. 11 is a schematic diagram showing the location of the unloading port with respect to the rotors when viewed from the side of the pumping apparatus at which the unloading port is located.

The chamber 81 communicates with a laterally extending passageway 137, as shown in Figs. 1 and 2. This passage is adapted to be connected under the control of a spring loaded valve 138 with a passage 139 opening into a longitudinal slot which opens into an annular chamber 140 surrounding the sleeve 114 and connected at its opposite side with a longitudinal slot which connects with a passage 141. The function of the spring loaded valve 138 is to maintain sufficient pressure in the chamber 81 under all circumstances when the compressor is running to insure the operation of the speed change mechanism. The passage 141 communicates with a bore 142, and a valve 143 is reciprocably contained within this bore and is urged by a spring 145 acting against an adjustable follower 147 toward a position cutting off communication between the passage 141 and the bore. A vent port 148 opens out of the bore 142 into the chamber 107 communicating with the sump. A port 150 connects the passage 141 in communication with a bore 151 in a valve seat member 152 mounted in a passage 153 which is connected by another passage 154 to the passage 57 leading to the servo motor 56 to which fluid is supplied to actuate the valve 40.

The bore 151 opens at one end into the passage 153 and opens at its other end into an enlarged bore 156 in the valve seat member. A valve element 157 has a portion 158 slidably received within the bore 151 and separated by a reduced portion 160 from an enlarged head portion 161 which is engageable with the shoulder at the juncture of the bores 151 and 156 for controlling the flow of fluid therebetween. Extending longitudinally through the valve element is a passage 162 opening at one end into the bore 151, and a port 163 in the valve element connects the passage 162 with the annular space 164 surrounding the reduced portion 160. The bore 156 of the valve seat member is connected by ports 166 with the chamber 107 which communicates with the sump 59 and which has the pressure therein maintained equal to the pressure at the exterior of the cabin by reason of a connection to the exterior through a suitable conduit, not shown. It will be evident that a seating of the valve element 157 cuts off the flow of fluid from the annular space 164 to the sump and causes all the fluid delivered to the annular space from the passage 141 to be delivered to the servo motor for maintaining the compressor loaded. If the valve element is held unseated sufficiently, the fluid in the servo motor as well as the fluid delivered through the passage 141 will be returned to the sump. In order that the pressures acting in opposite directions on the valve element may be balanced, there is provided a bellows device 170 connected at one end to the enlarged head portion 161 of the valve element and connected at its other end to a head member 171 threaded into the bore 156. Ports 172 connect the passage 162 in communication with the interior of the bellows device 170 so that the same pressures act on opposite ends of the valve element, and the effective cross-sectional area of the bellows device is made equal to the area within the seat provided by the member 152 so that the fluid pressure tending to seat the valve is the same as that tending to unseat it.

Connected to the valve element 157 is a stem 174 extending axially through the bellows device 170 and through an opening 175 in the head member 171, and a spring 176 acts between the head member and an adjustable member 177 carried by the stem for urging the valve element toward its unseated position. Surrounding the outer portion of the stem 174 is a bellows device 178 connected as by brazing to the head member 171 and having its outer end wall engageable with the end of the stem 174. Formed in the head member 171 are ports 180 connecting the interior of the bellows device 178 in communication with the bore 156 so that the pressures at the exterior of the cabin may be applied upon the interior of this bellows through the chamber 107, the ports 166 and the bore 156.

Formed in the pump casing 3 surrounding the valve seat member 152 is a recess 182, and attached to the side of the pump casing by any suitable means is a cover plate 183 having a recess 184 overlying the recess 182. Surrounding the recess 182 is an annular member 185 which is clamped between the end of the casing 3 and the cover plate 183, and attached to the annular member 185, as by brazing, is a bellows device 186 projecting into the recess 184 and connected at its outer end, as by brazing, to an end plate 188.

Formed in the cover plate 183 in axial alinement with the bellows device 186 is a bore 190 slidably receiving an abutment member 191 between which and the cover plate 188 a spring 192 acts in a direction to compress the bellows device 186. Threaded in an opening in the cover plate and extending into the bore 190 is a screw 193 which engages the member 191 and provides for an adjustment of the latter. Threaded on the cover plate is a cap 194 which provides protection for the screw 193. The bellows device 186 cooperates with the recess 182 to form a chamber 196 which is connected by a conduit 197 in communication with a point were the pressures are the same as those at the interior of the cabin to which air is supplied by the discharge line 200 of the compressor. This point may be located at some place in the discharge line 200 or, if desired, at any convenient place inside the walls of the cabin. The recess 184 in the cover plate and the exterior of the bellows device 186 from a chamber 201 which is connected by a conduit 202 in communication with the throat of a venturi 204 connected in the discharge line 200.

As mentioned above, it is customary to regulate the venting of air from the cabin so as to maintain the desired pressures therein. A venting means for the cabin to which air is supplied by the conduit 200 may desirably operate so as to permit cabin pressure to be approximately equal to ambient pressure as the aircraft flies below a predetermined altitude, to maintain the cabin pressure equal to the ambient pressure at such predetermined altitude as the aircraft flies between this altitude and a still higher altitude, and to permit the cabin pressure to drop again in a certain manner as the aircraft flies above the latter altitude. A venting means operating to produce such pressures in the cabin is disclosed in the patent to Price, Re. 22,272, granted February 16, 1943, this venting means permitting cabin pressure to equal ambient pressure up to an elevation of 8,000 feet, maintaining the cabin pressure approximately equal to the pressure at 8,000 feet as the aircraft flies from 8,000 to 16,000 feet, and then permitting the cabin pressure to decrease in such a manner that the difference between cabin and exterior pressures is constant as the aircraft flies above 16,000 feet. It is desirable, however, that the venting means for the cabin to which air is supplied by the compressor described above, be so adjusted that the cabin pressure is maintained constant between elevations of 8,000 feet and 30,000 feet and then is permitted to drop to maintain a constant differential between cabin and exterior pressures. With such pressure control, the spring 176 for the control means described above may be so adjusted that the bellows device 178 will operate at an elevation of 25,000 feet to seat the valve element 157.

The operation of the control means for the air-valve element 157 is as follows: When the aircraft is landed and the compressor is not operating, the pressure at opposite sides of each of the bellows devices 178 and 186 is the same. These bellows devices then tend to expand and permit the spring 176 to unseat the valve element 157. The abutment member 191 is adjusted, however, by the screw 193 so that the force offered by the spring 192 is sufficient to compress the bellows devices against the action of the spring 176 and hold the valve element seated. As soon as the compressor is started, the flow of air through the venturi in the discharge line 200 causes a reduced pressure in the throat of the venturi, and this reduced pressure acting in the chamber 201 results in an expansion of the bellows device 186 against the action of the spring 192. The spring 176 accordingly unseats the valve element and operates through the valve stem to expand the bellows device 178 until it engages the end plate 188. With the valve element unseated, fluid remaining in the servo motor 56 as well as that delivered through the passage 141 is vented past the valve element to the chamber 107 whence it is returned to the sump. The venting of fluid from the servo motor results in an opening of the valve 40 and in an "unloading" of the compressor, since air admitted to the rotor chambers from the intake is then discharged through the chamber 27 and the conduit 39 to the space surrounding the cabin until the diminishing chambers formed by the rotors overrun the port 38. The air remaining in the diminishing chambers after the port 38 is overrun is discharged without compression into the chamber 26 where it enters the conduit 200 and is conducted to the cabin. The flow of air in the conduit 200, when the compressor is unloaded, is sufficient, when the aircraft is flying at low elevations and the speed of the compressor is equal to that obtained by operation of the aircraft engine to maintain flight, to produce in the throat of the venturi a pressure which is low enough to cause the bellows device 186 to be held expanded by the cabin pressure acting in the chamber 196. The discharge of air to the conduit 200 diminishes, however, as the compressor slows down either because of a reduction in speed of the aircraft engine or because of the operation of the compressor speed changing mechanism and the flow may become so reduced that the pressure in the throat of the venturi is increased to the point where the bellows device 186 is compressed by the spring 192, seating—or partial seating—the valve element 157 and causing fluid to flow to the servo motor for closing the valve 40 and loading the compressor.

During flight of the aircraft below 8,000 feet the pressures acting on opposite sides of the lows device 178 will be the same; and this device will, therefore, effect no control of the valve element 157 during such flight.

The pressure on the inner wall of the bellows device 186 decreases as the elevation increases, making it necessary that the rate of flow in the discharge line be increasingly greater to hold the compressor unloaded as the elevation increases.

As the aircraft goes above 8,000 feet, the pressure at the interior of the bellows device 178 decreases and the pressure at its exterior remains equal to the ambient pressure at 8,000 feet. The pressure at the interior of the bellows device 186 also remains equal to the pressure at 8,000 feet, and the pressure at its exterior continues to vary with the flow of air in the discharge line. At 25,000 feet, the pressure at the interior of the bellows device 178 becomes such, with the spring setting assumed for the spring 176, that the spring 176 is overcome by this bellows device and the valve element 157 is held closed to effect a continuous loading of the compressor. Between 8,000 and 25,000 feet the valve element 157 is subjected to forces which consist of the force produced by the bellows device 178, opposed by the spring 176, with the superposed forces exerted by the spring 192 opposed by the bellows device 186. By making the bellows device 186 relatively large, compared with the bellows device 178, and making the spring 192 proportionally strong, it is possible for the control of the valve 157 between altitudes of 8,000 and 25,000 feet to be primarily by the bellows device last mentioned. It will be seen that there is obtained, during flight up to 25,000 feet, a gradual closure of the valve 157 as the altitude increases, and a greater closure of the valve 157 whenever the flow of air in the discharge line diminishes. During flight above 25,000 feet the compressor is held loaded continuously.

Figure 12:
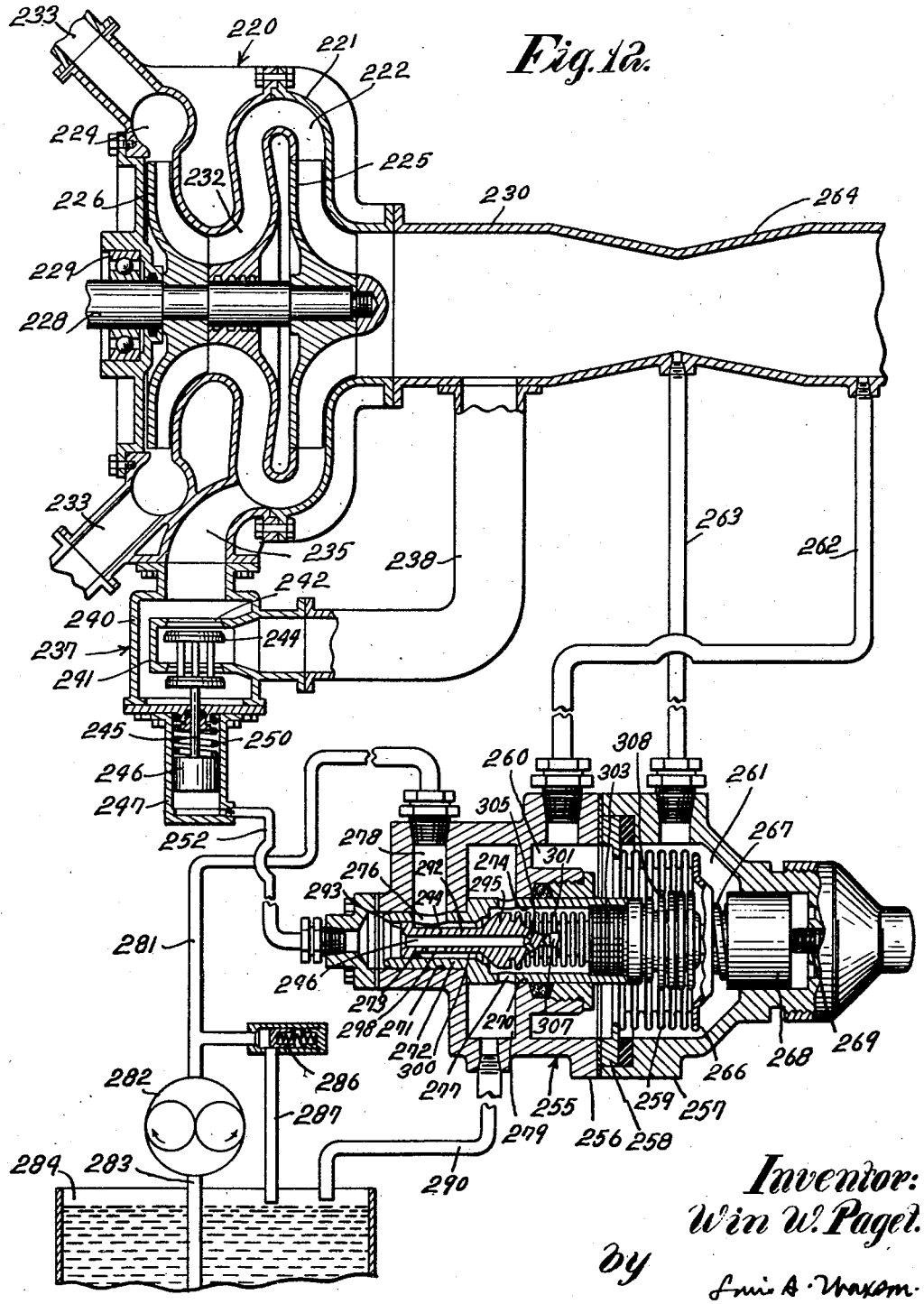
Fig. 12 is a sectional view, with parts shown in elevation, of a different form of pumping apparatus having my improved control means associated therewith.

In Fig. 12 there is shown a two-stage compressor, generally designated 220, comprising a casing 221 having chambers 222 and 224 in which impellers 225 and 226 are received. The impellers are fixed to a power shaft 228 which is rotatably supported by a bearing 229 carried by the casing. Air is taken from an intake line 230 into the chamber 222, where it is compressed by the impeller 225 and then discharged through passages 232 to the chamber 224 where it is compressed further by the impeller 226 and then discharged through conduits 233 to the cabin of an aircraft. Opening into the discharge side of the chamber 222 is a passage 235 which is adapted to be connected under the control of a valve mechanism 237 in communication with a conduit 238 opening into the intake line 230. The valve mechanism 237 includes a casing 240 having its interior communicating with the passage 235, and formed integral with the casing is a wall portion 241 having a port 242 connecting the interior of the casing in communication with the conduit 238. Cooperating with the port 242 is a valve element 244 which is connected by a stem 245 to a piston 246 reciprocably received within a cylinder member 247 attached to the valve casing. A spring 250 acts between the valve casing and the piston for urging the valve element away from the port 242. Opening into the cylinder member 247 beneath the piston 246 is a conduit 252 through which fluid may be supplied to or vented from the cylinder member for controlling the position of the valve element. It will be appreciated that a supply of fluid to the cylinder member will result in a closure of the valve element causing all air taken into the compressor to be discharged to the conduits 233, and a venting of fluid from the cylinder member will result in an opening of the valve element so that part of the air will be by-passed from the discharge side of the chamber 222 to the intake line 230. This by-passing of air will cause the quantity as well as the pressure of the air delivered through the conduits 233 to the cabin to be reduced.

The conduit 252 is connected in communication with fluid supply and venting means under the control of a control mechanism 255 similar to that described in the first form of my invention. This control mechanism includes casing elements 256 and 257 connected together by any suitable means and clamping between them an annular member 258 to which one end of a bellows device 259 is connected. This bellows device cooperates with recesses in the casing elements to form chambers 260 and 261 which are connected respectively by conduits 262 and 263 to the mouth and throat of a venturi 264 connected in the intake line 230. The bellows device 259 has a plate 266 closing its other end, and a spring 267 acts between this plate and an adjustable abutment member 268 for resisting expansion of the bellows device. A screw 269 threaded through an opening in the casing into engagement with the abutment member provides for adjustment of the latter. Fixed within bores 270 and 271 in the casing element 256 is a valve seat providing member 272 having stepped bores 273 and 274 communicating with each other and connected respectively by ports 276 and 277 in communication with chambers 278 and 279 formed in the casing element 256. The chamber 278 has communication with a conduit 281 leading from the discharge side of a pump 282 which, in turn, has its intake connected by a conduit 283 in communication with a sump 284. The discharge conduit 281 is also connected, under the control of a spring pressed valve 286, to a conduit 287 leading to the sump so as to prevent the pressures in the discharge line from exceeding a predetermined value. The chamber 279 is connected by a conduit 290 in direct communication with the sump.

Received within the bores 273 and 274 is a valve member 292 having a portion 293 slidably received within the bore 273 and separated by a reduced portion 294 from an enlarged portion 295 which is engageable with the shoulder formed at the junction of the bores for controlling the communication between the latter. Extending longitudinally through the valve member is a passage 296 opening at its left-hand end into the bore 273 which communicates through the bore 271 with the conduit 252. Formed in the valve member is a port 298 connecting the passage 296 in communication with the space 300 surrounding the reduced valve portion 294. When the valve member is seated, fluid delivered to the chamber 278 from the conduit 281 will pass through the port 298 into the passage 296 and will be conducted through the conduit 252 to the cylinder member 247 for actuating the piston 246 and moving the valve 244 in a closing direction. When the valve member 292 is unseated, fluid delivered to the chamber 278 as well as fluid in the cylinder member 247 will be vented through the space 300 surrounding the reduced valve portion, the bore 274, the ports 277, the chamber 279 and the conduit 290 to the sump. In order that the fluid pressures acting on the valve member may be balanced, there is provided a bellows device 301 connected at one end to the enlarged valve portion 295 and connected at its other end to a head member 303 closing the right-hand end of the bore 274. The interior of the bellows device 301 is connected by ports 305 in communication with the passage 296 so that fluid will be delivered to its interior where it will act on the valve member. The valve member has a stem 307 formed integral therewith and extending axially into a bellows device 308 which has its interior connected through the bore 274, the ports 277, the chamber 279, and the conduit 290 to the sump where the pressure is maintained equal to that at the exterior of the cabin.

In this form of the invention the flow of air through the venturi in the intake line 230 produces pressure differentials which are caused to act on the bellows device 259 for controlling the position of the valve member 292. As the flow of air in the intake line increases, the pressure differential also increases and tends to expand the bellows device so that the valve member may be moved to its unseated position by a spring, not shown, acting on the valve stem as described in the first form of the invention. The unseating of the valve causes fluid discharged by the pump 282 to the chamber 278 to be returned through the chamber 279 to the sump and causes any fluid within the cylinder member 247 to be vented therefrom so that the valve 244 is moved to its opened position. The discharge of fluid from the compressor to the cabin will then be reduced since the passage 235 will conduct fluid from the discharge side of the chamber 222 to the conduit 238 communicating with the intake line 230. As the aircraft increases in altitude, the mass flow of air in the intake line will be reduced by reason of the reduced density, thus causing a reduction in the pressure differential acting on the bellows device 259. The pressures acting on opposite sides of the bellows device 308 remain balanced, however, since the pressures in the mouth of the venturi are equal to the ambient pressures, these being the same pressures to which the interior of the bellows device 308 is subjected. This bellows device acts in this form of the invention merely as a seal between the chamber 260 and the bore 274. The reduction of the pressure differential on the bellows device 259 causes a decrease in the resistance offered by it to compression by the spring 267, and, on a predetermined reduction of the pressure differential, the valve member 292 will be seated to cut off the escape of fluid through the chamber 279 and the conduit 290 to the sump. Fluid will then be delivered from the chamber 278 through the port 298 in the valve member, the passage 296, the bore 271 and the conduct 252 to the cylinder member 247 where it will act on the piston 246 and effect a seating of the valve element 244. The by-passing of fluid from the discharge side of the chamber 222 to the intake line will then be cut off and all of the air taken into the compressor will be discharged from the latter through the conduits 233 to the aircraft cabin.

As a result of my invention in the form last described there is provided a compressor having improved control means which operates to regulate the supply of air to the cabin of an aircraft. It will be seen that the control means is made responsive to the mass flow of air to or from the compressor, the mass flow varying with the elevation of flight and with the speed of the compressor, and operates to vary the loading of the compressor so as to maintain the flow constant.

While there are in this application specifically described two forms which the invention may assume in practice, it will be understood that these forms of the same are shown for purposes of illustration, and that the invention may be modified and embodied in various other forms without departing from its spirit or the scope of the appended claims.

What I claim as new and desire to secure by Letters Patent is:

1. A compressor for delivering air to an aircraft cabin comprising, in combination, a casing having a chamber containing means for compressing air, an intake line for said chamber, a discharge line through which air is discharged when a predetermined compression is reached, an opening through which air may be discharged from said chamber before said predetermined compression is reached, valve means for controlling the flow of air through said opening, a flow sensitive device disposed in said discharge line, and means under the influence of said flow sensitive device and operative to control said valve means in a manner to maintain constant the flow of air in said discharge line.

2. A compressor for delivering air to an aircraft cabin comprising, in combination, a casing having a chamber containing means for compressing air, an intake line for said chamber, a discharge line through which air is discharged when a predetermined compression is reached, an opening through which air may be discharged from said chamber before said predetermined compression is reached, valve means for controlling the flow of air through said opening, a flow sensitive device disposed in said discharge line, and means under the influence of said flow sensitive device and tending to close said valve means as the flow of air in said discharge line decreases.

3. A compressor for delivering air to an aircraft cabin comprising, in combination, a casing having a chamber containing means for compressing air, an intake line for said chamber, a discharge line through which air is discharged when a predetermined compression is reached, an opening through which air may be discharged from said chamber before said predetermined compression is reached, valve means for controlling the flow of air through said opening, a venturi connected in said discharge line, and means responsive to the flow pressure in said venturi and operative to control said valve means in a manner to maintain constant the flow of air in said discharge line.

4. A compressor for delivering air to an aircraft cabin comprising, in combination, a casing having a chamber containing means for compressing air, an intake line for said chamber, a discharge line through which air is discharged when a predetermined compression is reached, an opening through which air may be discharged from said chamber before said predetermined compression is reached, valve means for controlling the flow of air through said opening, a venturi connected in said discharge line, and means responsive to the flow pressure in said venturi and tending to close said valve means as the flow of air through said venturi decreases.

5. A compressor for delivering air to an aircraft cabin comprising, in combination, a casing having a compression chamber containing means for compressing air therein, a discharge line through which air is discharged from said compression chamber to the cabin, an opening through which air may be vented from said compression chamber, valve means for controlling the flow of air through said opening, a flow sensitive device disposed in said discharge line, and means under the influence of said flow sensitive device and operative to control said valve means in a manner to maintain constant the flow of air through said discharge line.

6. A compressor for delivering air to an aircraft cabin comprising, in combination, a casing having a compression chamber containing means for compressing air therein, a discharge line through which air is discharged from said compression chamber to the cabin, an opening through which air may be vented from said compression chamber, valve means for controlling the flow of air through said opening, a flow sensitive device disposed in said discharge line, and means under the influence of said flow sensitive device and tending to close said valve means as the flow of air in said discharge line decreases.

7. A compressor for delivering air to an aircraft cabin comprising, in combination, a casing having a compression chamber containing means for compressing air therein, a discharge line through which air is discharged from said compression chamber to the cabin, an opening through which air may be vented from said compression chamber, valve means for controlling the flow of air through said opening, a venturi in said discharge line, and means responsive to the flow pressure in said venturi and tending to close said valve means as the flow of air through said venturi decreases.

8. A compressor for delivering air to an aircraft cabin comprising, in combination, a casing having a compression chamber containing means for compressing air therein, a discharge line through which air is discharged from said compression chamber to the cabin, an opening through which air may be vented from said compression chamber before reaching said discharge line, valve means for controlling the flow of air through said opening, a venturi in said discharge line, means including a pressure responsive device for controlling said valve means, said pressure responsive device having oppositely directed pressure areas, means for connecting one of said pressure areas to the flow pressure in said venturi, and means for connecting the other of said pressure areas to the pressure at the interior of the cabin.

9. A compressor for delivering air to an aircraft cabin comprising, in combination, a casing having a compression chamber containing means for compressing air therein, a discharge line through which air is discharged from said compression chamber to the cabin, an opening through which air may be vented from said compression chamber before reaching said discharge line, valve means for controlling the flow of air through said opening, a venturi in said discharge line, means including a pressure responsive device for controlling said valve means, said pressure responsive device having oppositely directed pressure areas, means for connecting one of said pressure areas to the flow pressure in said venturi, and means for connecting the other of said pressure areas to the pressure at the interior of the cabin, said pressure responsive device operating on increase of the pressure differential at its areas to effect an increased opening of said valve means.

10. A compressor for delivering air to an aircraft cabin comprising, in combination, a casing having a compression chamber containing means for compressing air therein, a discharge line through which air is discharged from said compression chamber to the cabin, an opening through which air may be vented from said compression chamber before reaching said discharge line, valve means for controlling said opening, means including a pressure responsive device for controlling said valve means, said pressure responsive device having oppositely directed pressure areas, means for subjecting one of said areas to cabin pressure, and means for subjecting the other of said areas to the pressure surrounding said cabin.

11. A compressor for delivering air to an aircraft cabin comprising, in combination, a casing having a compression chamber containing means for compressing air therein, a discharge line through which air is discharged from said compression chamber to the cabin, an opening through which air may be vented from said compression chamber before reaching said discharge line, valve means for controlling said opening, means including a pressure responsive device for controlling said valve means, said pressure responsive device having oppositely directed pressure areas, means for subjecting one of said areas to cabin pressure, and means for subjecting the other of said areas to the pressure surrounding said cabin, said pressure responsive device operative when the cabin pressure exceeds the surrounding pressure by a predetermined amount to effect a closure of said valve means.

12. A compressor for delivering air to an aircraft cabin comprising, in combination, a casing having a compression chamber containing means for compressing air therein, a discharge line through which air is discharged from said compression chamber to the cabin, a venturi in said discharge line, an opening through which air may be vented from said compression chamber, vavle means for controlling said opening, means including pressure responsive devices for controlling said valve means, each of said pressure responsive devices having oppositely directed pressure areas, means for subjecting one area of each of said pressure responsive devices to cabin pressure, means for subjecting the other area of one of said pressure responsive devices to the pressures surrounding the cabin, and means for subjecting the other area of the other of said pressure responsive devices to the flow pressure in said venturi.

13. A compressor for delivering air to an aircraft cabin comprising, in combination, a casing having a compression chamber containing means for compressing air therein, a discharge line through which air is discharged from said compression chamber to the cabin, a venturi in said discharge line, an opening through which air may be vented from said compression chamber, valve means for controlling said opening, means including pressure responsive devices for controlling said valve means, each of said pressure responsive devices having oppositely directed pressure areas, means for subjecting one area of each of said pressure responsive devices to cabin pressure, means for subjecting the other area of one of said pressure responsive devices to the pressures surrounding the cabin, means for subjecting the other area of the other of said pressure responsive devices to the flow pressure in said venturi, said pressure responsive device having an area subjected to the pressures surrounding the cabin operative when the pressure differential between its areas increases to a predetermined value for effecting a closure of said valve means, and said pressure responsive device having an area subjected to the flow pressure in said venturi operative when the pressure differential between its areas decreases to a predetermined value for effecting a closure of said valve means.

14. A compressor for delivering air to an aircraft cabin comprising, in combination, a casing having a compression chamber containing means for compressing air therein, an intake conduit for said compressor, a discharge conduit through which air is discharged from said compression chamber to the cabin, passage means through which air may be conducted from said compression chamber, valve means for controlling said passage means, a flow sensitive device disposed in one of said conduits, and means under the influence of said flow sensitive device and operative to control said valve means in a manner to maintain constant the flow of air through said discharge conduit.

15. A compressor for delivering air to an aircraft cabin comprising, in combination, a casing having a compression chamber containing means for compressing air therein, an intake conduit for said compressor, a discharge conduit through which air is discharged from said compression chamber to the cabin, passage means through which air may be conducted from said compression chamber, valve means for controlling said passage means, a flow sensitive device disposed in said intake conduit, and means under the influence of said flow sensitive device and operative to control said valve means in a manner to maintain constant the flow of air through said discharge conduit.

16. A compressor for delivering air to an aircraft cabin comprising, in combination, a casing having a compression chamber containing means for compressing air therein, an intake conduit for said compressor, a discharge conduit through which air is discharged from said compression chamber to the cabin, passage means through which air may be conducted from said compression chamber, valve means for controlling said passage means, a venturi connected in said intake conduit, and means including a pressure responsive device subjected to the flow pressures in said venturi and controlling said valve means in a manner to maintain constant the flow of air through said discharge conduit.

17. A compressor for delivering air to an aircraft cabin comprising, in combination, a casing having a compression chamber containing means for compressing air therein, an intake conduit for said compressor, a discharge conduit through which air is discharged from said compression chamber to the cabin, passage means through which air may be conducted from said compression chamber, valve means for controlling said passage means, a venturi connected in said intake conduit, means including a pressure responsive device for controlling said valve means, said pressure responsive device having oppositely directed pressure areas, means for subjecting one of said pressure areas to the flow pressures in said venturi, and means for subjecting the other of said pressure areas to the pressures at the exterior of the cabin.

18. A compressor for delivering air to an aircraft cabin comprising, in combination, a casing having a compression chamber containing means for compressing air therein, an intake conduit for said compressor, a discharge conduit through which air is discharged from said compression chamber to the cabin, passage means through which air may be conducted from said compression chamber, valve means for controlling said passage means, a venturi connected in said intake conduit, means including a pressure responsive device for controlling said valve means, said pressure responsive device having oppositely directed pressure areas, means for subjecting one of said pressure areas to the flow pressures in said venturi, and means for subjecting the other of said pressure areas to the pressures at the exterior of the cabin, said pressure responsive device operative as the flow pressure in the venturi drops below the pressure at the exterior of the cabin to effect a gradual opening of said valve means.

19. A compressor for delivering air to an aircraft cabin comprising, in combination, a casing having compression chambers therein in which air is compressed in stages before being discharged to the cabin, means for compressing air in said chambers, an intake conduit communicating with one of said compression chambers, a discharge conduit connecting another of said compression chambers to the cabin, passage means connecting the discharge side of one of said compression chambers to said intake conduit, valve means for controlling said passage means, a venturi connected in said intake conduit, and means subjected to the flow pressure in said venturi and operative to control said valve means in a manner to maintain substantially constant the flow of air in said discharge conduit.

20. A compressor comprising, in combination, means for effecting multistage compression including elements constituting a first stage compressor and elements constituting a second stage compressor, means providing an intake for said first stage compressor, means providing a discharge for the second stage compressor, means providing a connection between said first and second stage compressors, means providing a passage connecting the discharge side of said first stage compressor with the means providing an intake therefor, valve means controlling said passage, a flow sensitive device in said intake, and means under the influence of said flow sensitive device and operative to control said valve means in a manner to maintain constant the flow in said discharge providing means.

21. A compressor comprising a casing and rotors therein, an intake to one end of said casing, a discharge at the other end of said casing, and passage means opening out of said casing at a point between the intake and discharge and having valve means controlling the same for variably venting pressure from said casing, and controlling means for said valve means including a venturi in said discharge and means responsive to pressure differentials in said venturi.

22. A compressor comprising a casing and rotors therein, an intake to one end of said casing, a discharge at the other end of said casing, and passage means opening out of said casing at a point between the intake and discharge and having valve means controlling the same for variably venting pressure from said casing, and controlling means for said valve means governed by the mass flow in said discharge and closing said valve progressively as mass flow tends to decrease.

23. A compressor for delivering air to an aircraft cabin comprising, in combination, a casing having a compression chamber containing means for compressing air therein, a discharge line through which air is discharged from said compression chamber to the cabin, an opening through which air may be vented from said compression chamber before reaching said discharge line, valve means for controlling the flow of air through said opening, a venturi in said discharge line, means including a pressure responsive device for controlling said valve means so connected to the latter that each moves with the other, said pressure responsive device having oppositely directed pressure areas, means for connecting one of said pressure areas to the flow pressure in said venturi, and means for connecting the other of said pressure areas to the pressure at the interior of the cabin.

WIN W. PAGET.

REFERENCES CITED

The following references are of record in the file of this patent:

UNITED STATES PATENTS

| Number | Name | Date |
|---|---|---|
| 1,097,259 | Nusim | May 19, 1914 |
| 1,110,864 | Banner | Sept. 15, 1914 |
| 2,002,057 | Gregg | May 21, 1935 |
| 2,276,371 | Cooper et al. | Mar. 17, 1942 |
| 2,284,984 | Nixon et al. | June 2, 1942 |
| 2,309,064 | Gregg et al. | Jan. 19, 1943 |
| 2,316,237 | Grunert et al. | Apr. 13, 1943 |
| 2,316,416 | Gregg | Apr. 13, 1943 |
| 2,377,199 | Adams et al. | May 29, 1945 |
| 2,385,664 | Warner | Sept. 25, 1945 |

Certificate of Correction

Patent No. 2,444,952.

July 13, 1948.

WIN W. PAGET

It is hereby certified that errors appear in the printed specification of the above numbered patent requiring correction as follows:

Column 1, line 12, for "not withstanding" read *notwithstanding*; column 3, line 58, for the word "thereby" read *thereof*; column 6, line 8, before "latter" insert *the*; line 41, for "vavle" read *valve*; column 8, line 8, for "passageway" read *passage*; column 9, line 51, for "from" read *form*; column 16, line 41, for "vavle" read *valve*;

and that the said Letters Patent should be read with these corrections therein that the same may conform to the record of the case in the Patent Office.

Signed and sealed this 7th day of December, A. D. 1948.

[SEAL]

THOMAS F. MURPHY,
*Assistant Commissioner of Patents.*